(12) United States Patent
Perantatos et al.

(10) Patent No.: US 8,341,175 B2
(45) Date of Patent: Dec. 25, 2012

(54) AUTOMATICALLY FINDING CONTEXTUALLY RELATED ITEMS OF A TASK

(75) Inventors: George Perantatos, Seattle, WA (US); Kuldeep Kamawat, Bellevue, WA (US); John S. Wana, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 491 days.

(21) Appl. No.: 12/560,435

(22) Filed: Sep. 16, 2009

(65) Prior Publication Data
US 2011/0066619 A1 Mar. 17, 2011

(51) Int. Cl.
*G06F 7/00* (2006.01)
*G06F 17/30* (2006.01)
(52) U.S. Cl. ............................ 707/766; 707/770
(58) Field of Classification Search ............... 707/713, 707/765, 766, 769, 770
See application file for complete search history.

(56) References Cited

U.S. PATENT DOCUMENTS

| | | | |
|---|---|---|---|
| 6,366,298 B1 | 4/2002 | Haitsuka et al. | |
| 7,039,699 B1 | 5/2006 | Narin et al. | |
| 7,343,365 B2 * | 3/2008 | Farnham et al. | 715/853 |
| 7,346,606 B2 | 3/2008 | Bharat | |
| 7,523,191 B1 | 4/2009 | Thomas et al. | |
| 2003/0158855 A1 * | 8/2003 | Farnham et al. | 707/102 |
| 2005/0222987 A1 | 10/2005 | Vadon et al. | |
| 2006/0037076 A1 | 2/2006 | Roy | |
| 2006/0271520 A1 | 11/2006 | Ragan | |
| 2007/0027881 A1 | 2/2007 | Srivastava | |
| 2007/0203869 A1 | 8/2007 | Ramsey et al. | |
| 2007/0299631 A1 | 12/2007 | Macbeth et al. | |
| 2008/0276179 A1 | 11/2008 | Borenstein et al. | |
| 2009/0077027 A1 | 3/2009 | King et al. | |

OTHER PUBLICATIONS

Mahadev et al., Minimizing user interaction in energy management systems: task adaptive visualization, 1996, IEEE, 1607-1612.*
Gombotz et al., Relevance-Based Context Sharing Through Interaction Patterns, 2006, IEEE, 1-7.*
"International Search Report", Mailed Date: Jun. 1, 2011, Application No. PCT/US2010/049002, Filed Date: Sep. 15, 2010, pp. 9.
Imsand, Eric Shaun, "Applications of GUI Usage Analysis" retrieved at <<http://etd.auburn.edu/etd/bitstream/handle/10415/1046/Imsand_Eric_35.pdf?sequence=1>>, May 10, 2008.
"Real User Monitoring" retrieved at <<http://en.wikipedia.org/wiki/Real_user_monitoring>>, Jul. 29, 2009.
Oliver, et al., "SWISH: Semantic Analysis of Window Titles and Switching History", retrieved at <<http://research.microsoft.com/apps/pubs/?id=54886>>, Proceedings of the 11th international conference on Intelligent user interfaces, Jan. 29-Feb. 1, 2006.
Dumais, et al., "Implicit Queries (IQ) for Contextualized Search", retrieved at <<http://portal.acm.org/citation.cfm?id=1009137>>, Proceedings of the 27th annual international ACM SIGIR conference on Research and development in information retrieval, Jul. 25-29, 2004.

* cited by examiner

*Primary Examiner* — Jean B Fleurantin

(57) ABSTRACT

Architecture for enabling a user to automatically recover documents and other information associated with work contexts and recover documents and other information artifacts associated with a specific project. The architecture enables monitoring and recording of activity information related to user interactions with information artifacts pertaining to a particular work context. The user can select a document having a portion of work content (e.g., a term or other type of reference item in a document) related to the work context. A lexical analysis is performed on the activity information and the reference item to identify lexical similarities. A list of candidate items (e.g., related documents) is inferred from the information artifacts based on the lexical similarities. The candidate items related to the work context are presented to the user, who can select specific items to reestablish the work context.

7 Claims, 11 Drawing Sheets

AUTOMATICALLY FINDING CONTEXTUALLY RELATED ITEMS OF A TASK

BACKGROUND

Users switch contexts frequently when working. This can be due to interruptions, and the need to put aside the work being performed for a particular task in order to switch to another task. Upon returning to the original task, users can have a problem recalling all of the items upon which they were working (e.g., files, applications, locations, people, communications, etc.) in order to resume the original task.

Problems related to context switching can be alleviated if users rigorously kept records of everything and everyone involved in a particular work context. However, it can be just as much work creating a complete record of all the items used in a particular work context than performing the actual work itself. Additionally, certain items cannot be easily recorded. For example, it can be difficult to save or reference an email message, an instant message conversation, or an application that does not produce a file, such as a calculator.

In practice, users typically rely on memory recall to relocate and rebuild work contexts. However, this can be a time-consuming and error-prone strategy. Users can also rely on traditional search engines that accept keyword queries for locating relevant web pages and other items. With a search engine, a specific phrase or parameter is entered in order to locate relevant items. While search engines produce results, the engines oftentimes produce a great number of irrelevant results, and therefore, are not helpful in recalling a specific set of items related to a particular task.

Additionally, keyword search results merely present a list of items containing relevant terms. Even if a target list of relevant results is obtained from a keyword search, a search can typically only retrieve documents, not application states. It can be time-consuming to perform searches, with little assurance that a precise list of previous work context items can be reconstructed.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Architecture is disclosed for identifying items such as documents and other types of information artifacts related to a work context in which a user has worked, and enabling retrieval (e.g., manual, automatic) of the items after leaving the original context to reconstitute the work context effectively and efficiently.

Multiple streams of information can be combined to automatically infer contextual relationships for a given task. For example, user activity such as switching between documents and copy/paste operations can be monitored and recorded. A lexical analysis is performed on the user activity and also with a reference item to infer relationships between items worked on by the user. Contextually-related items are presented to the user based on the reference item, producing results that represent related items for a specific user task worked on previously by the user, rather than the broad, generalized results obtained from a typical keyword-based search.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
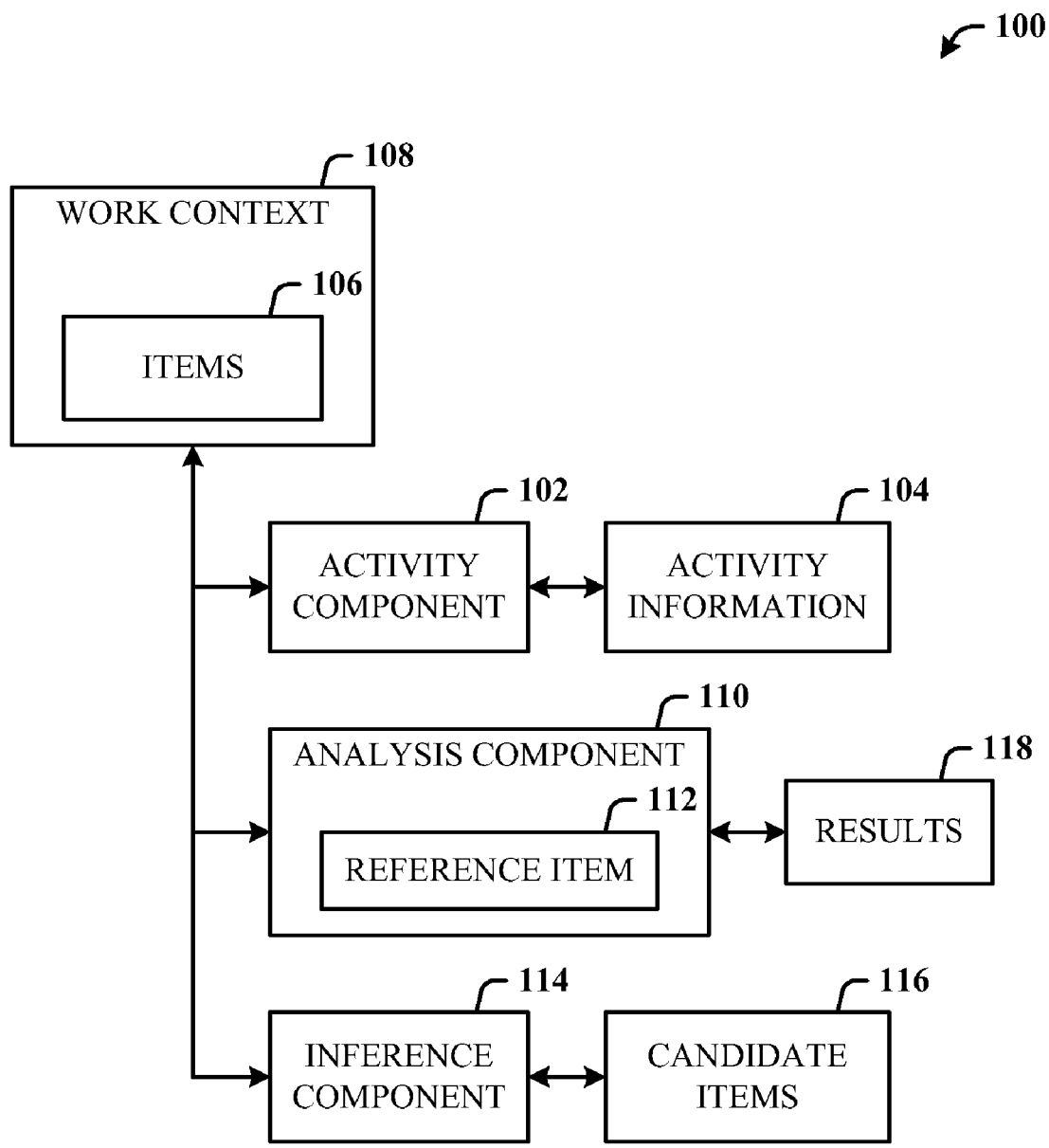
FIG. 1 illustrates a computer-implemented contextual system in accordance with the disclosed architecture.

The disclosed architecture enables the automatic recovery of documents and information artifacts associated a specific work context and, the recovery of the documents and other information artifacts associated when reconstituting the work context. The architecture enables monitoring and recording of activity information related to user interactions with information artifacts pertaining to a particular work context. The user can select a document having a term or other type of reference item related to the work context. Analysis (e.g., lexical) can be performed on the reference item and on documents having activity information related to the reference item to identify similarities. A list of candidate items (e.g., related documents) is inferred from the information artifacts based on the similarities derived from the analysis. The candidate items related to the work context are presented to the user, who can then select, for example, specific items to reconstitute the work context.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a computer-implemented contextual system 100 in accordance with the disclosed architecture. An activity component 102 is provided that monitors and records activity information 104 related to user interaction with items 106 associated with a work context 108. The items 106 can be documents or other types of information artifacts, as described in detail hereinbelow. An analysis component 110 performs analysis (e.g., lexical) on a reference item 112 and the items 106 associated with the activity information 104. An inference component 114 infers candidate items 116 based on the activity information 104 and results 118 of the analysis when reconstituting the work context 108.

As used herein, "context" can refer to content viewed, read (e.g., reads between applications or an application and data), and/or created by a user, where the content can be a text-based document and/or other information artifact. Context can also refer to communications associated with the content, such as emails or instant messages. Additionally, context can refer to one or more locations in which the content was read or used, which can include websites, network or local folders, collaborative sites, etc. Further, context can refer to an environment relating to the content, such as a setting in which users were while dealing or interacting with the content. The environment can be a personal desktop in a meeting where certain participants were involved, for example. Context can also refer to other individuals (e.g., collaborators and/or participants) associated with the communications, locations, and environment, etc.

As illustrated in FIG. 1, the analysis component 110 performs lexical analysis on the reference item 112, which can be a document or other type of information artifact previously opened by the user. It is to be understood, however, that other types of analysis can be utilized instead of or in combination with lexical analysis. The activity information 104 is compared to determine activity common to other items of the items 106. Common activity can be a switch (navigation) between documents, for example. If common activity to a subset of the items 106 is noted, lexical analysis is performed on the subset to determine whether there are lexical intersections between the items 106 and the reference item 112. These lexical intersections are output as the results 118. The results 118 are compared with the activity information 104 (e.g., the number of switches between documents) to suggest the candidate items 116.

As illustrated in FIG. 1, the contextual system 100 produces results based on the reference item 112, in contrast with search engines that rely on user entry of keywords to produce results that match the keywords. For example, a user can return to a work context of planning a site visit by starting with a currently opened presentation document. The presentation document is the reference item 112, and functions as the "query" rather than keywords in a search. The contextual system 100 produces the candidate items 116 by identifying intersections of user activity with lexical analysis over that activity. In one aspect, the items 106 can be identified based on user activity and then differentiated using lexical analysis, which can produce a very precise list of the candidate items 116.

Instances of pure user activity with no lexical matches can produce results that are not relevant, such as checking an unrelated email or surfing an unrelated web page while working on a document. Instances of pure lexical matching with no user activity can yield unrelated items that happen to share the same words (e.g. "site" in an email about a site visit as well as a website or a drop site). Thus, instances that have both lexical and activity matches represent high-precision results for the given work context the user is trying to rebuild.

Figure 2:
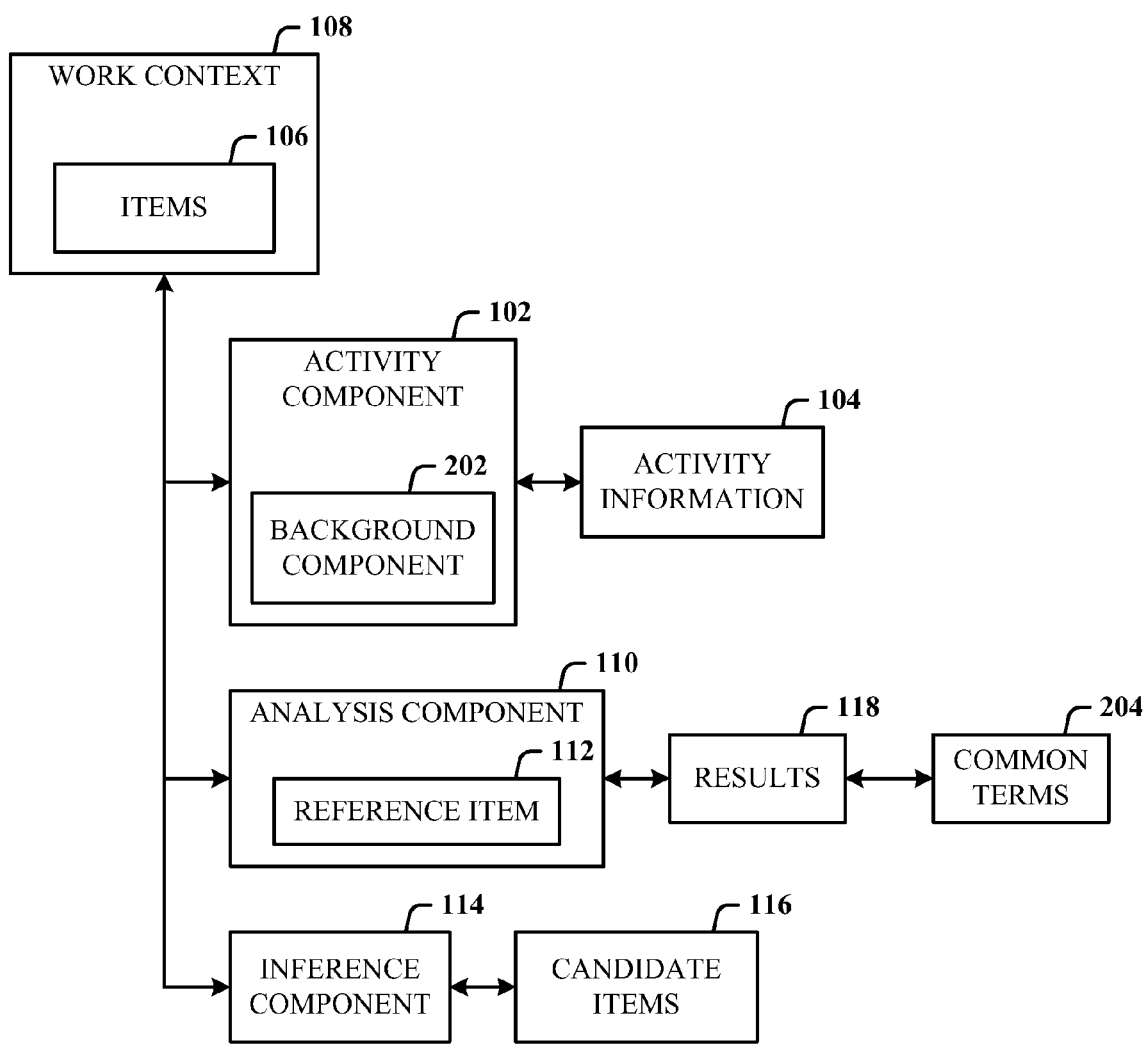
FIG. 2 illustrates an alternative embodiment of a contextual system that includes additional entities for background monitoring and analysis.

FIG. 2 illustrates an alternative embodiment of a contextual system 200 that includes additional entities for background monitoring and analysis. The activity component 102 can include a background component 202 that monitors user activity as an operation that is transparent to the user and without user interaction. In this manner, the activity information 104 can be obtained in the background without interrupting the user or requiring any user feedback.

As illustrated in FIG. 2, the results 118 of the lexical analysis can include processing common terms 204 found in the reference item 112 and the candidate items 116. The lexical analysis can examine content and metadata associated with the information artifacts to cluster related content together based on a starting point of content in the reference item 112. The common terms 204 can include common senders and/or receivers in emails, common noun phrases in subject lines, and indications of how content is organized by the user, such as file folders, categories, and tags, for example.

The common terms 204 can also specifically include common nouns, noun-phrases, author names, and participants, found in content or metadata. The nouns can be extracted from email subject lines and document titles as lexical attributes, and can also be extracted content, location/path, email sender/recipients, etc. Any other suitable scheme can be employed where the user introduces a level of additional information about the content.

Figure 3:
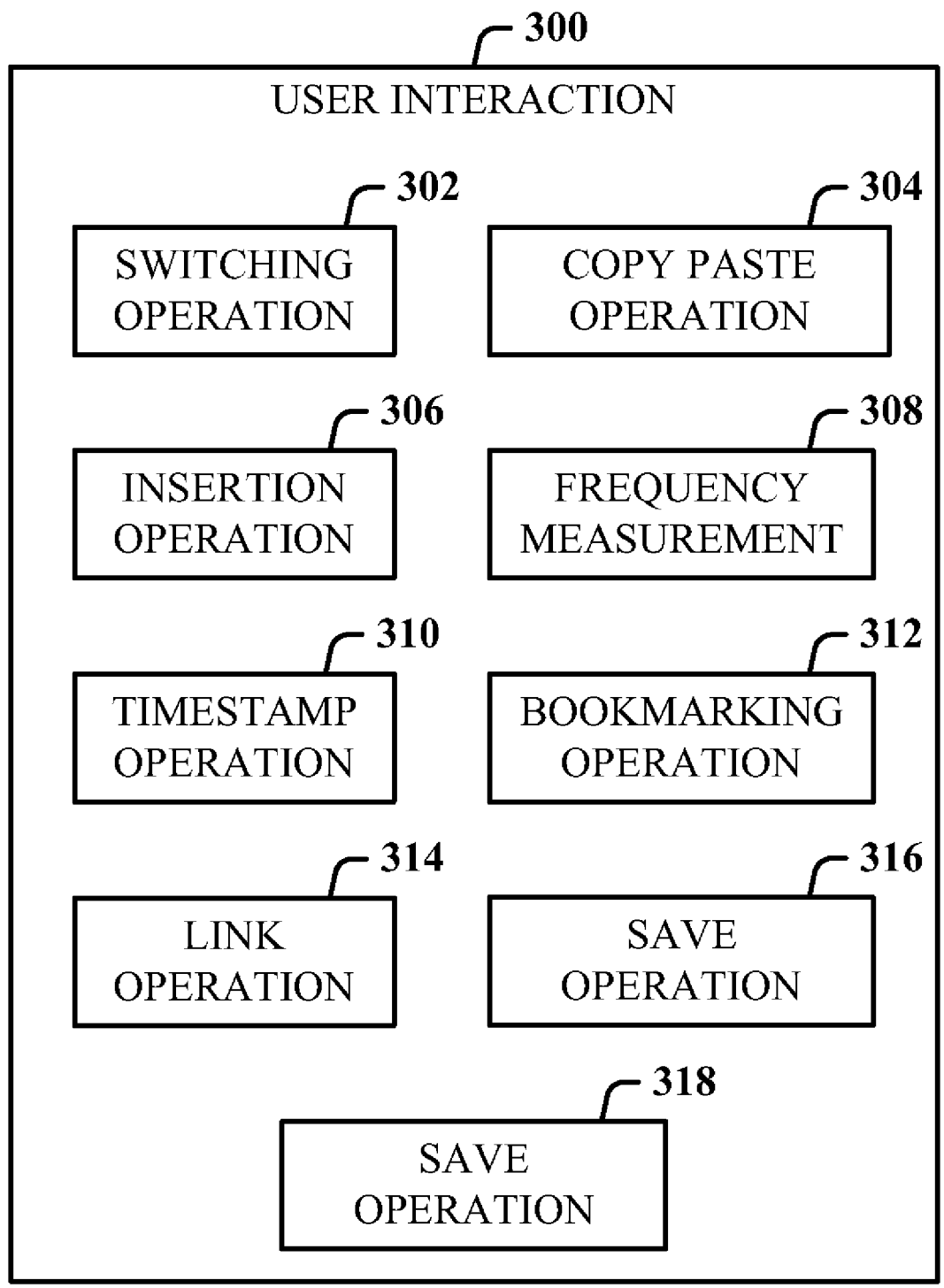
FIG. 3 illustrates types of user interactions used with the contextual system.

FIG. 3 illustrates types of user interactions 300 that can be used with the contextual system. The user interactions 300 can include a switching operation 302 between the programs or data. The switching operation 302 indicates co-accessed documents that can indicate patterns and activities that suggest relationships between documents. The switching operation 302 indicates the programs, data, documents, and/or other information artifacts that were accessed by the user proximate the time when the reference item 112 was in focus by the user. The switching operation 302 can be used as a starting point for determining possible associations to the initial document or email used as the reference item 112.

As illustrated in FIG. 3, the user interactions 300 can also include a copy/paste operation 304 between the programs or data. Other user interactions 300 can include an insertion operation 306 of the programs or data into an attachment, in an email or other type of message, for example. A toggle frequency measurement 308 can be used to measure the number of instances of switching between documents, which can be used to ascertain a common relationship for work context 108. A timestamp operation 310 can be used to determine whether the candidate items 116 were created, edited, or saved within a suitable time period proximate the reference item 112. A bookmarking operation 312 can be used to determine whether a resource was recorded for future reference. A link operation 314 can suggest common work context 108 since the link operation provides access between documents. A save operation 316 of an item as a copy in another location can be used to suggest the common work context 108. Dwell time 318 (e.g., total activity time) spent on an information artifact can be used to suggest the work context 108. For example, the dwell time 318 can be the total amount of time spent working on a draft, or time spent reviewing the draft, and can be measured as keyboard and/or mouse activity, for example.

As illustrated in FIG. 3, an example is provided in which the switching operation 302 can be used as the activity information 104 by the analysis component 110 and the inference component 114 to determine whether co-accessed documents share a common context. Switching between documents can be recorded as indicating whether a document was a source document or a target document in the switching operation 302, whether the source document was closed before switching to the target document, whether the target was in focus (foreground) by the user for a predetermined minimum interval (e.g., less than three seconds), whether the target was opened in the background (e.g., opened in a web browser tab which was not in focus), whether the source document was the first document switched from after the target document was opened, and whether the target document was the last document switched to before the source document was closed. Additionally, the number of times the user switches between particular documents can be recorded.

The aforementioned user interactions 300 (and combinations thereof) can be evaluated by the analysis component 110 and the inference component 114 for relevance in filtering document co-access instances that do not indicate (with high probability) documents with shared context. Other related metadata can be logged subsequently for relevance in filtering results.

Figure 4:
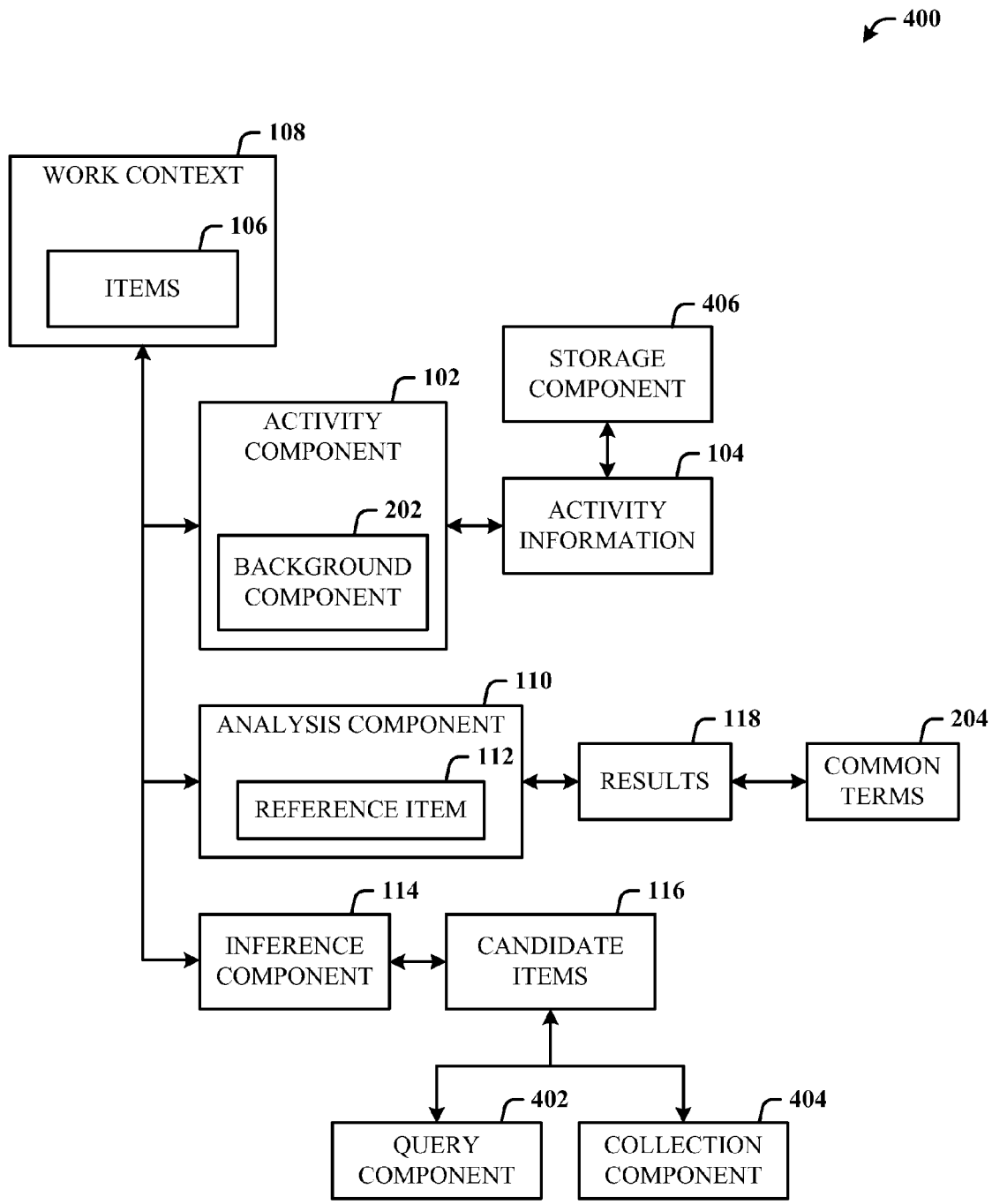
FIG. 4 illustrates an alternative embodiment of a contextual system that includes additional entities for background collection, querying, and storage.

FIG. 4 illustrates an alternative embodiment of a contextual system 400 that includes additional entities for background collection, querying, and storage. A query component 402 can be provided for explicitly querying for the candidate items 116 related to the reference item 112. The query component 402 explicitly examines the reference item 112 and queries the system 400 for related items to infer the candidate items 116. The reference item 112 can be a selected document provided by the user that includes a clue as a starting point.

Optionally, a collection component 404 can be provided for collecting a set of the candidate items 116 and implicitly querying the set for candidate items 116 related to the reference item 112. In this manner, the collection component 404 implicitly infers the reference item 112 and automatically collects items together to present to the user, to identify related items without requiring the user to provide a clue up front.

As illustrated in FIG. 4, a storage component 406 can be provided for storing the activity information 104 locally and/or remotely. The storage component 406 can be any suitable data storage system used for local storage, such as a computer internal or external hard drive, a writable CD or DVD, or any removable memory component such as a flash drive. The storage component 406 can alternatively be any suitable data storage component for remote storage, such as a network server or drive, a tape backup, or offsite storage facility.

In one aspect, the contextual system (e.g., system 100, 200, 400) does not store user content but rather the activity information 104 associated with the user. For example, if a document is opened and multiple switching operations are performed between the document and an email message, the switching operations are logged onto a server as identification (ID) numbers that reference the document and email message with a time stamp. No document content is represented by the ID numbers. The ID numbers can be resolved using a local desktop search index and corresponding application programming interfaces (APIs) to perform the lexical analysis. Thus, the contextual system can perform lexical analysis for the document using local data stored in the local desktop search index and activity information 104 can be obtained from the server.

Figure 5:
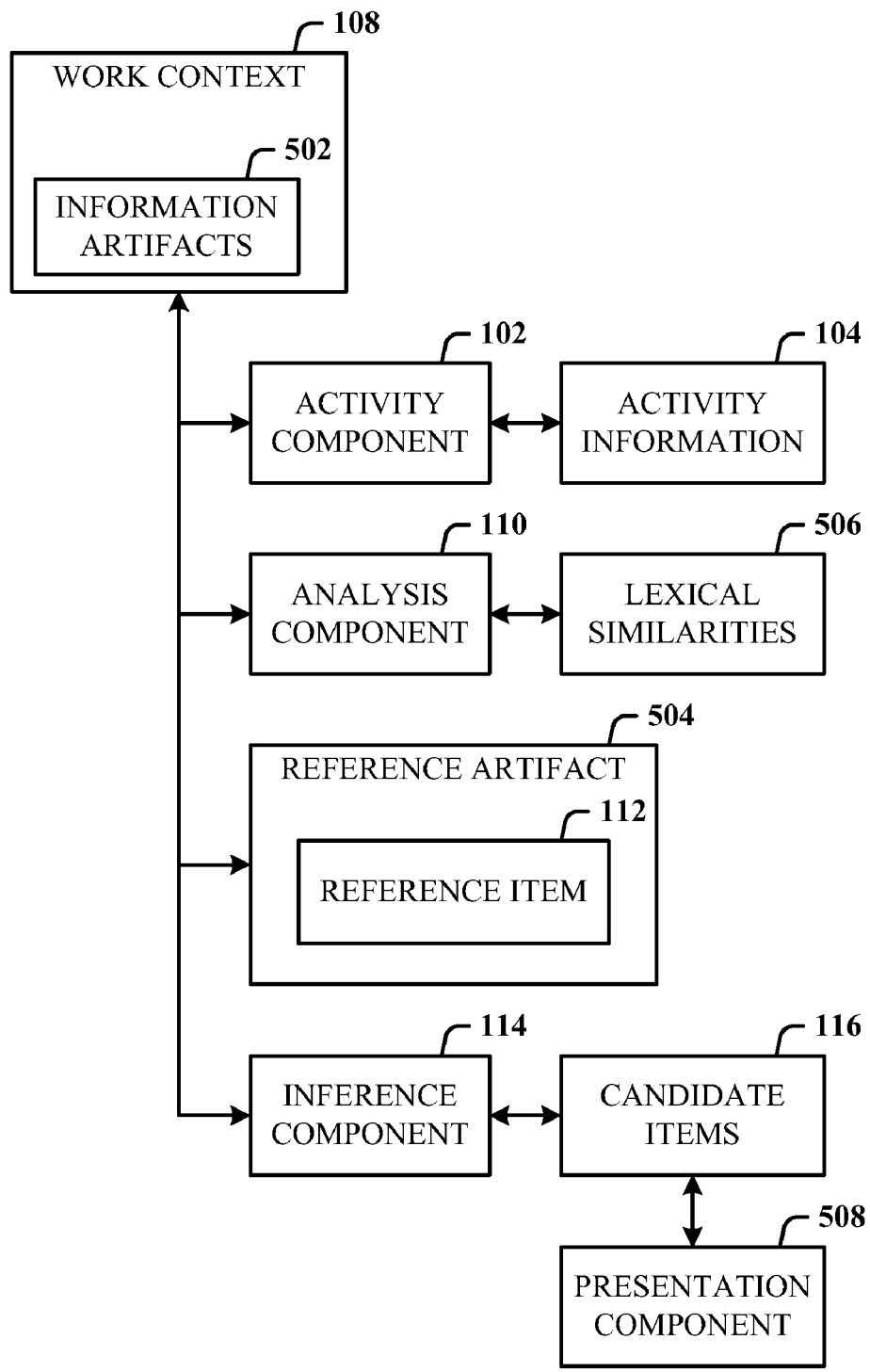
FIG. 5 illustrates an alternative embodiment of a contextual system.

FIG. 5 illustrates an alternative embodiment of a contextual system 500. The activity component 102 monitors and records the activity information 104 related to user interaction with information artifacts 502 in the work context 108. As described hereinabove, the information artifacts 502 can be documents or other types of data, as described in detail hereinbelow. A reference artifact 504 includes one or more of the reference items 112 related to the work context. The analysis component 110 performs lexical analysis on the activity information 104 and the reference item 112 to identify lexical similarities 506. The inference component 114 infers the candidate items 116 selected from the information artifacts 502 based on the lexical similarities 506. A presentation component 508 is provided for presenting the candidate items 116 related to the work context 108.

Figure 6:
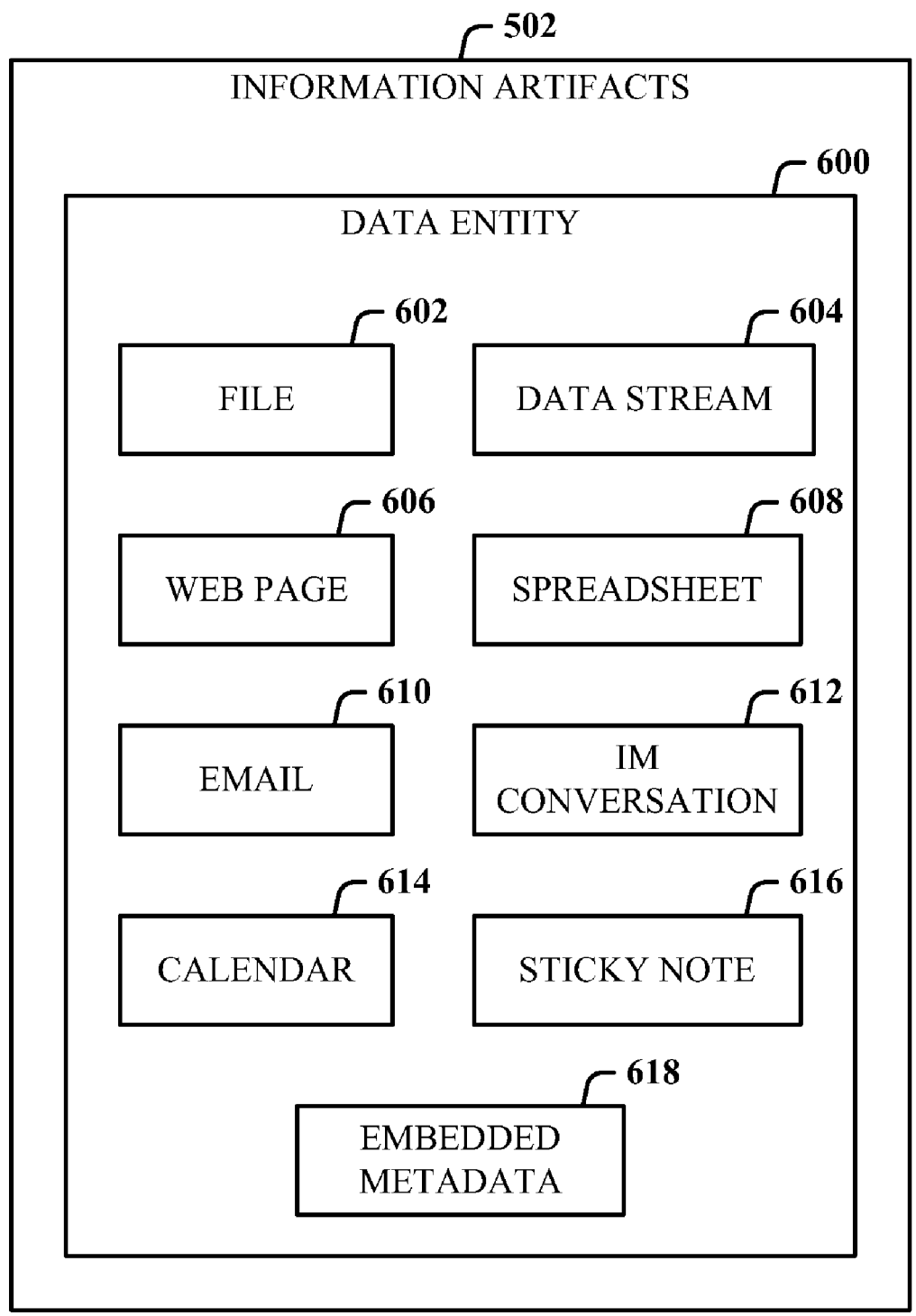
FIG. 6 illustrates types of information artifacts used with the contextual system.

FIG. 6 illustrates types of information artifacts 502 that can be used with a contextual system. The information artifacts 502 can include one or more types of user recognizable and usable data entity 600. The data entity 600 can include a file 602 associated with any type of application. The data entity 600 can also include a data stream 604 such as any active process carrying information that can be accessed. The data entity 600 can further include a web page 606 that includes data objects consumable by a web browser or other suitable reader.

The data entity 600 can additionally be a spreadsheet 608, an email message 610, an IM conversation 612, a calendar appointment 614, a sticky note 616, or embedded metadata 618 contained in any of the aforementioned types of the data entity 600, or any other type of the information artifacts 502. The embedded metadata 618 can be included in a drawing document or other non-text-based document, for example. It is to be appreciated that the information artifacts 502 can include any types or formats of documents or other data structure in which the user is involved in creating or consuming.

The activity information 104 can be extended across applications that do not produce the information artifacts 502. The activity information 104 can be useful if it can preserve an application state that can be used for reconstituting the work context 108. For example, if a user is employing a spreadsheet and switches between the spreadsheet and a calculator application, the switching of the activity information 104 can be useful in inferring the work context 108.

Figure 7:
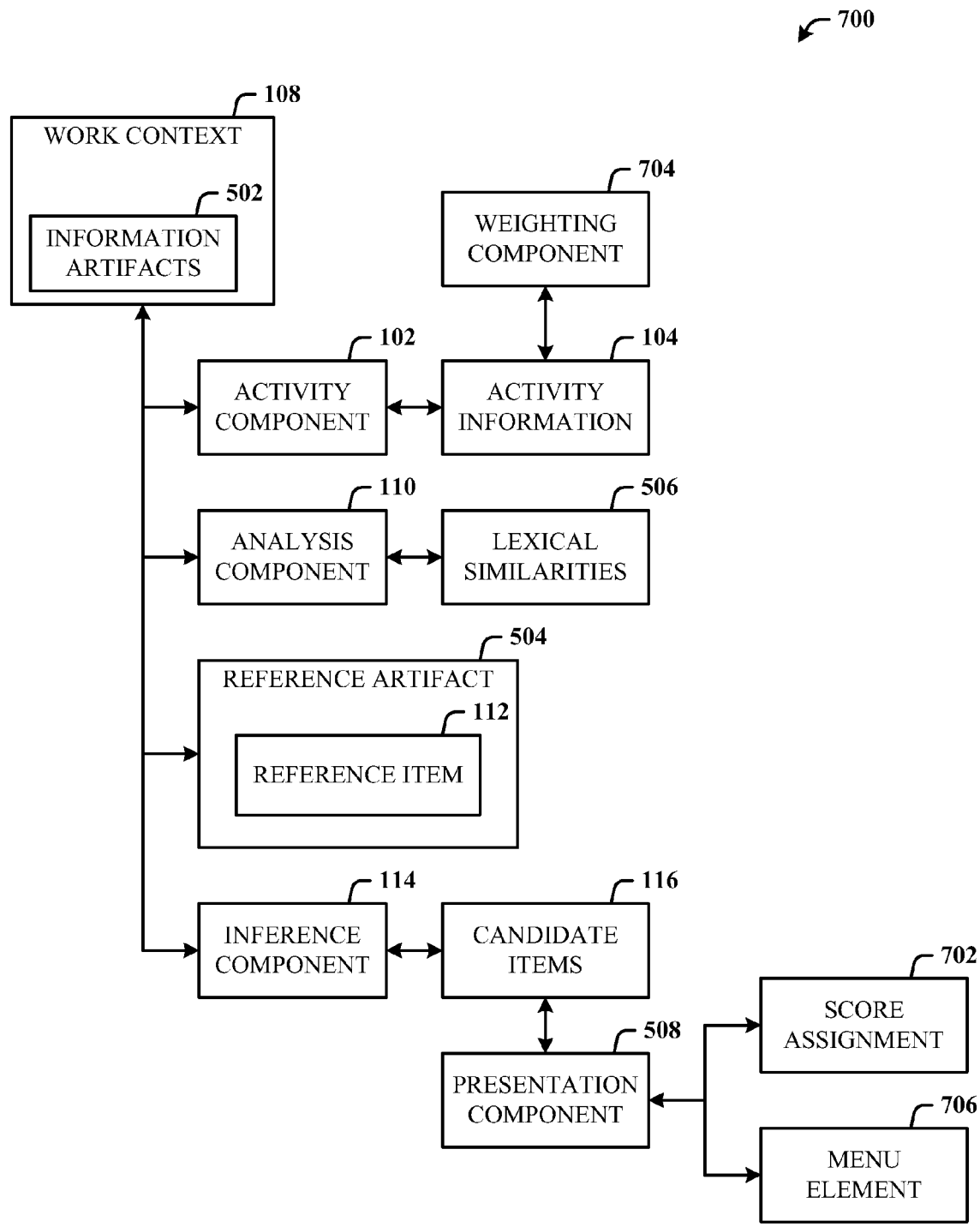
FIG. 7 illustrates an alternative embodiment of a contextual system that includes additional entities for scoring, weighting, and manually displaying.

FIG. 7 illustrates an alternative embodiment of a contextual system 700 that includes additional entities for scoring, weighting, and manually displaying context information. The presentation component 508 can include a score assignment 702 for hierarchically ranking the candidate items 116. The score assignment 702 enables the candidate items 116 to be ranked based on additional information, such as a higher or lower value assigned to a particular one of the user interactions 300 or the information artifacts 502.

For example, the score assignment 702 can be a lexical score based on the product of term frequency and inverse document frequency (TFIDF):

$$TFIDF = \Sigma(\text{Term Frequency} * \text{Inverse Document Frequency})$$

where, for each matching noun,

Term Frequency (normalized)=number of occurrences of the matching noun in the document/total number of nouns in the document, and Inverse Document Frequency=ln (T/L) (i.e., the natural log of (Total number of documents/Number of documents containing the noun)).

In another example, the score assignment 702 can be a co-access score based on the product of switch frequency and inverse document frequency (SFIDF):

$$SFIDF = \text{Switch frequency} * \text{Inverse Document frequency},$$

where,

Switch Frequency (normalized)=number of switches with reference document/total number of switches associated with the document Inverse Document Frequency=ln (T/L) (i.e., the natural log of (Total number of documents/Number of documents with at least one switch with reference document)

Additionally, the lexical score and co-access score can be combined into a single score. A greater number of reference points can indicate a greater likelihood of a relevant match. Two overlapping intersections can indicate greater relevance than a single intersection and two overlapping intersections, such as a document and an email both having lexical and activity intersections with a web page, which increases the ranking of the web page since there are two references rather than one to the work context.

As illustrated in FIG. 7, a weighting component 704 can be used to assign a weighting factor that indicates the relevance of at least one predetermined activity information item. The weighting component 704 can be used to assign more weighting or less weighting to the relevance to a particular document or activity. The weighting can be associated with the types of the user interactions 300 and the information artifacts 502, in order to assign greater or lesser value.

The copy/paste operation 304 can be assigned a high value in inferring the work context 108, since content is being duplicated between documents. The insertion of a document as an attachment to an email, or inserting a link to the document, can be considered highly related based on the nature of the activity, more so than switching between documents. Additionally, weighting can be considered based on the time between switches, where a quick series of switches can suggest less relevance, for example.

As illustrated in FIG. 7, an actionable menu element 706 is provided for manually displaying the candidate items 116 in a user interface. The menu element 706 can be a button in a user interface at a specific location in a document application. The button can be clicked, and thereafter the user is presented with the set of the candidate items 116 associated with the work context 108 of the document. The candidate items 116 can include other documents, related emails, web pages containing relevant terms opened with the document, etc. The menu element 706 can also be a sidebar having an automatically generated list of relevant items associated with a particular task or project related to the document. Alternatively, the menu element can be a desktop item, where a set of documents are considered to be reference items, rather than the single reference item 112.

Figure 8:
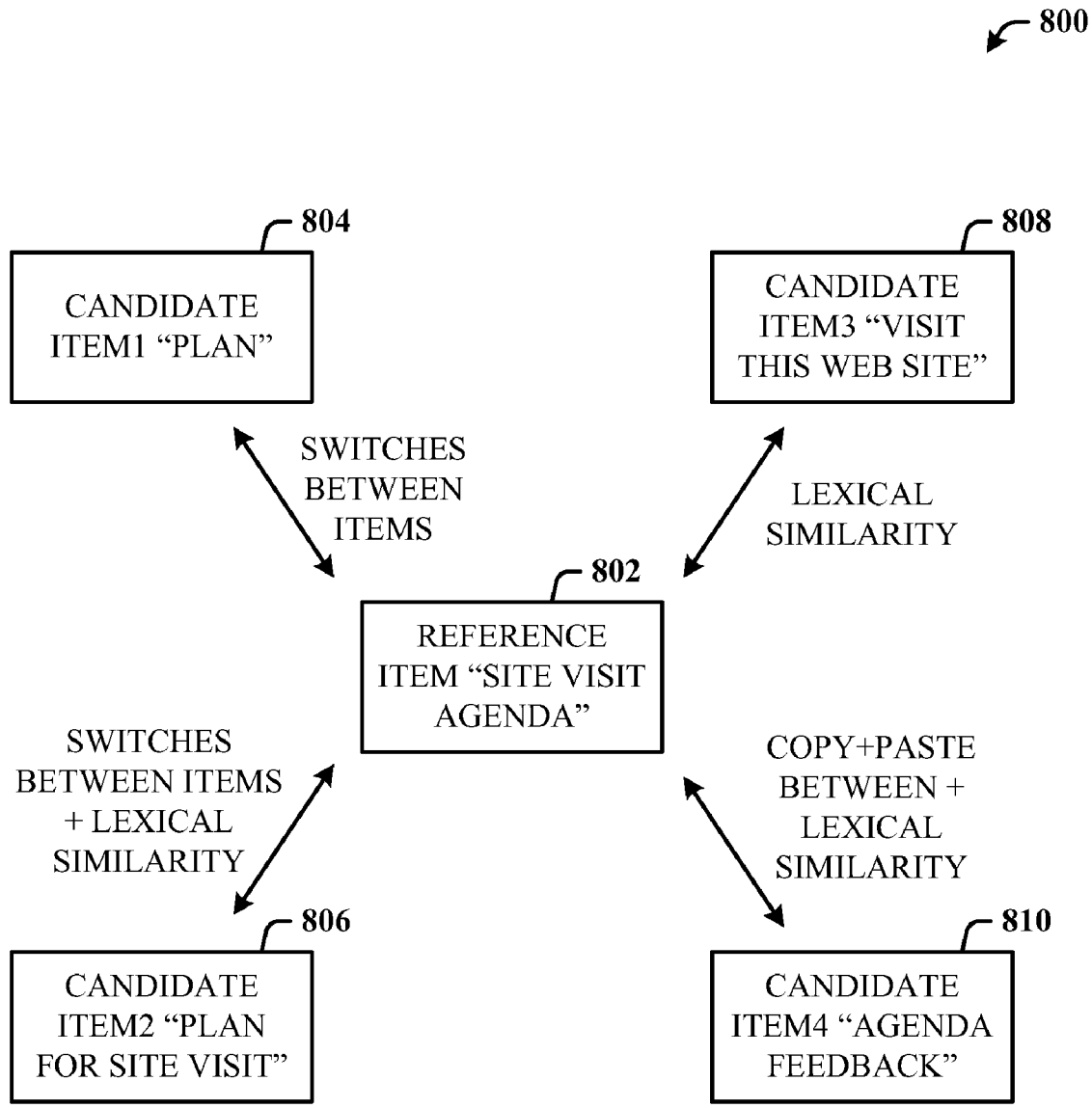
FIG. 8 illustrates an implementation for inferring contextual relationships in accordance with the disclosed architecture.

FIG. 8 illustrates an implementation 800 for inferring contextual relationships in accordance with the disclosed architecture. The implementation 800 is an exemplary conceptual diagram depicting five items being recorded by the contextual system. A reference item 802 represents a portion of the work context that the user is trying to resume (e.g., a "site visit agenda" document). Four candidate items are available. Candidate item1 804 is a document representing a "plan" and has some recorded switch activity between this document and the reference item. However, there is no lexical similarity between the candidate item1 804 and the reference item 802.

Candidate item2 806 relates to a "plan for site visit" and has both recorded switching activity and lexical similarities ("site visit") with the reference item. Candidate item3 808 includes the terms "visit this web site" but has only lexical similarities ("visit," "site") with the reference item. Candidate item4 810 has both recorded copy/paste activity and lexical similarities ("agenda") with the reference item. The result is that only the candidate item2 806 and the candidate item4 810 are returned as contextually related to the reference item 802.

An exemplary scenario follows herewith to demonstrate the operation of the contextual architecture disclosed herein. User1, a member of a marketing team, focuses on print and web advertisements for a company. User1 is working on a project when an IM is received instructing User1 to find out which foreign country magazines are suitable for advertizing specialty gear. User1 has browsed some websites in the past pertaining to this subject, but has not formally investigated the matter.

User1 creates a new space for this task (e.g., a workspace or a folder), adds to the space the received IM and, locates and adds to the space a presentation document that includes prior research related to this task. The contextual system automatically adds content to the space related to the creation or dissemination of the content already in the space, such as the sources from which User1 copied and pasted to create the presentation document, and emails sent that included relevant content. The contextual system automatically suggests information artifacts related to the content in the space by profiling information artifacts viewed and worked on by User1, including activity related to the information artifacts, to help reconstitute the work context. The suggestions can be based on the content already in the space, matching keywords, authors, and collaborators, and other information artifacts open around the same time as the content in the space.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 9:
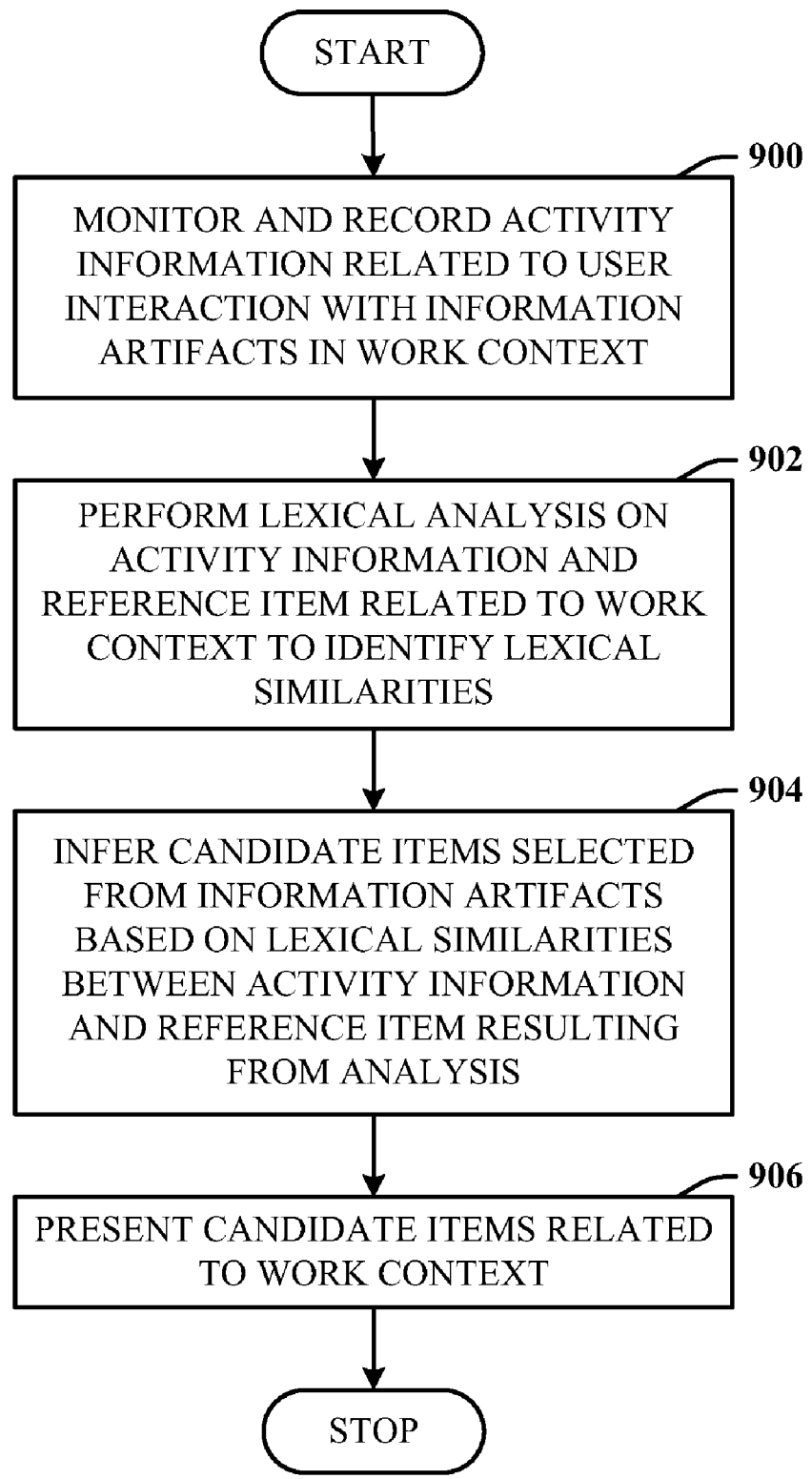
FIG. 9 illustrates a method of inferring contextual relationships.

FIG. 9 illustrates a method of inferring contextual relationships. At 900, monitoring and recording is performed for activity information related to user interaction with information artifacts in a work context. At 902, lexical analysis is performed on the activity information and a reference item related to the work context to identify lexical similarities. At 904, candidate items are inferred where the candidate items are selected from the information artifacts based on the lexical similarities between the activity information and the reference item resulting from the analysis. At 906, the candidate items related to the work context are presented.

Figure 10:
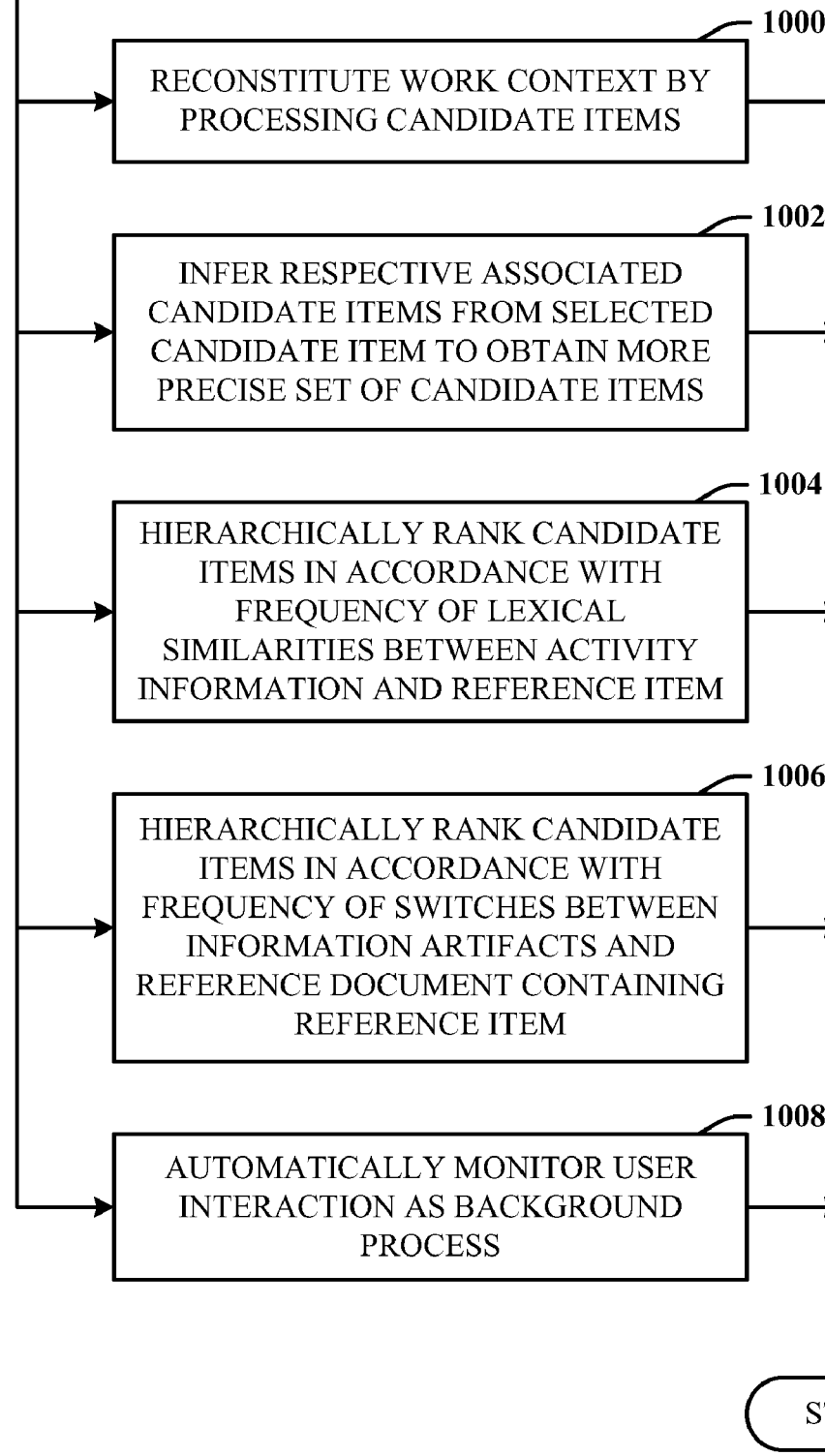
FIG. 10 illustrates additional aspects of the method of inferring contextual relationships.

FIG. 10 illustrates additional aspects of the method of inferring contextual relationships of FIG. 9. At 1000, the work context is reconstituted by processing the candidate items. At 1002, respective associated candidate items are inferred from a selected candidate item to obtain a more precise set of candidate items. In this manner, a specific candidate item can become a reference item for its own set of candidate items, and the latter set can be compared to the initial set to produce an expanded set of candidate items beyond only the candidate items inferred from the original reference item.

As illustrated in FIG. 10, at 1004, the candidate items are hierarchically ranked in accordance with frequency of lexical similarities between the activity information and the reference item. At 1006, the candidate items are hierarchically ranked in accordance with frequency of switches between the information artifacts and a reference document containing the reference item. At 1008, the user interaction is automatically monitored as a background process.

As disclosed herein, the contextual system and method infers relationships between items worked on by a user by intersecting activity information with lexical analysis of items related to the activity information. The contextual system and method presents contextually related items to a user based on a reference item, by querying inferred relationships and thereby producing high-precision results. The contextual system and method combines two streams of information (i.e., user activity and lexical analysis) to automatically infer contextual relationships associated with a specific task or work context. The contextual system and method provides monitoring of specific user activities (including document switching, copy paste operations, insertions of attachment or links, and/or bookmarking, as mentioned hereinabove) from which to draw inferences. In this manner, the contextual system and method produces high-precision results that represent related items for a specific user task or work context.

Rather than simply providing results of a general keyword-based search, the contextual system and method discovers items related to a given work context or task based on interactions with information artifacts seen and worked with previously by the user. In this way, the contextual system and method can assist users in returning to relevant content for a given task faster than can be done otherwise. The contextual system and method can assist users uncover content related to a particular task that might have otherwise been forgotten. The contextual system and method can thus enable the users to intuitively perceive at a glance whether candidate items have a high value. The contextual system and method is particularly useful in tasks associated with work contexts that span multiple work sessions, more than a day or two apart, and also multiple applications, and situations where the user has not filed or recorded everything seen or done as part of the task.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical, solid state, and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 11:
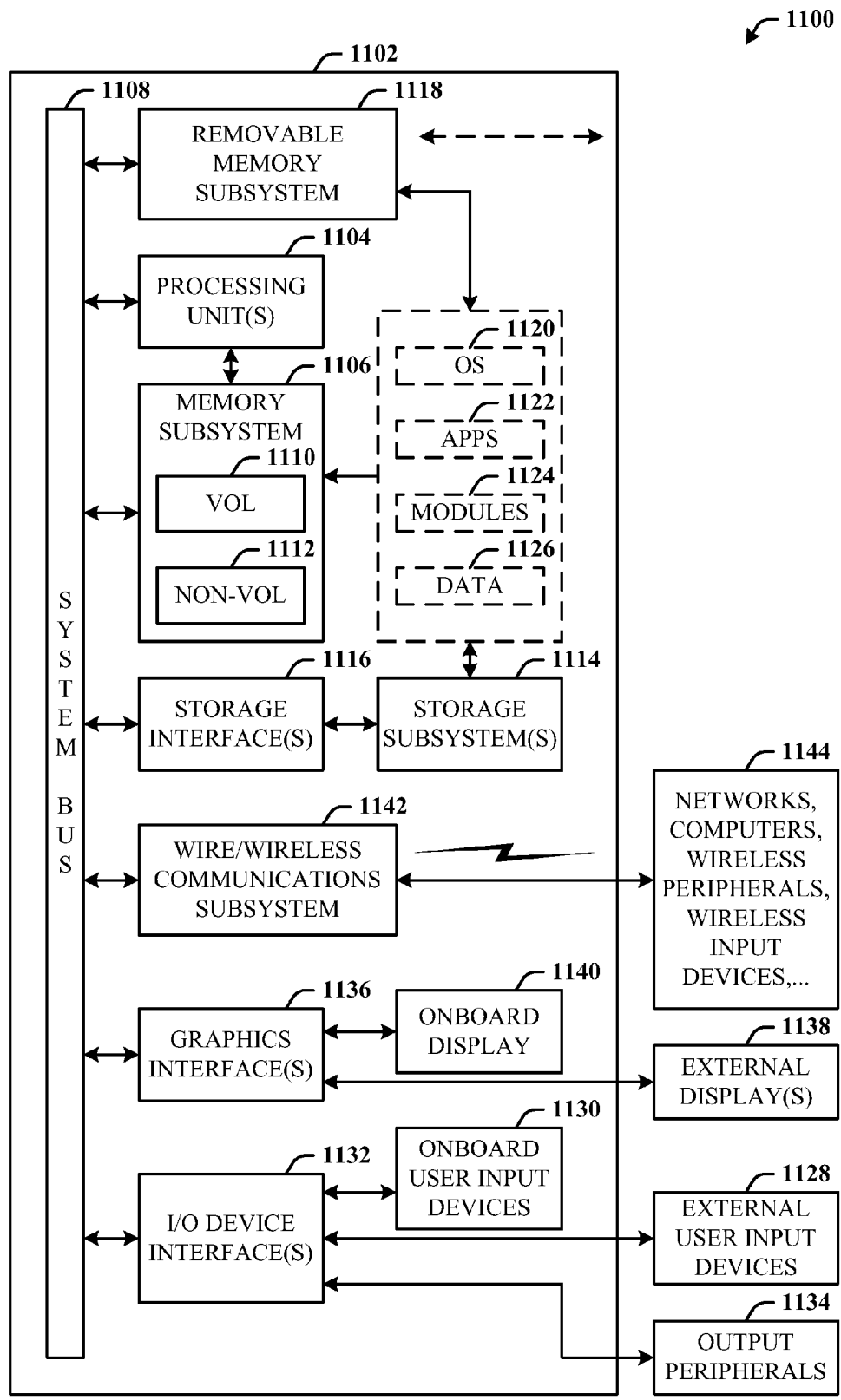
FIG. 11 illustrates a block diagram of a computing system operable to provide inference of contextual relationships in accordance with the disclosed architecture.

Referring now to FIG. 11, there is illustrated a block diagram of a computing system 1100 operable to execute inference of contextual relationships in accordance with the disclosed architecture. In order to provide additional context for various aspects thereof, FIG. 11 and the following discussion are intended to provide a brief, general description of the suitable computing system 1100 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 1100 for implementing various aspects includes the computer 1102 having processing unit(s) 1104, a system memory 1106, and a system bus 1108. The processing unit(s) 1104 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 1106 can include volatile (VOL) memory 1110 (e.g., random access memory (RAM)) and non-volatile memory (NON-VOL) 1112 (e.g., ROM, EPROM, EEPROM, etc.). A basic input/output system (BIOS) can be stored in the non-volatile memory 1112, and includes the basic routines that facilitate the communication of data and signals between components within the computer 1102, such as during startup. The volatile memory 1110 can also include a high-speed RAM such as static RAM for caching data.

The system bus 1108 provides an interface for system components including, but not limited to, the memory subsystem 1106 to the processing unit(s) 1104. The system bus 1108 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 1102 further includes storage subsystem(s) 1114 and storage interface(s) 1116 for interfacing the storage subsystem(s) 1114 to the system bus 1108 and other desired computer components. The storage subsystem(s) 1114 can include one or more of a hard disk drive (HDD), a magnetic floppy disk drive (FDD), and/or optical disk storage drive (e.g., a CD-ROM drive DVD drive), for example. The storage interface(s) 1116 can include interface technologies such as EIDE, ATA, SATA, and IEEE 1394, for example.

One or more programs and data can be stored in the memory subsystem 1106, a removable memory subsystem 1118 (e.g., flash drive form factor technology), and/or the storage subsystem(s) 1114 (e.g., optical, magnetic, solid state), including an operating system 1120, one or more application programs 1122, other program modules 1124, and program data 1126.

Generally, programs include routines, methods, data structures, other software components, etc., that perform particular tasks or implement particular abstract data types. All or portions of the operating system 1120, applications 1122, modules 1124, and/or data 1126 can also be cached in memory such as the volatile memory 1110, for example. It is to be appreciated that the disclosed architecture can be implemented with various commercially available operating systems or combinations of operating systems (e.g., as virtual machines).

The aforementioned application programs 1122, program modules 1124, and program data 1126 can include the computer-implemented system 100, the activity component 102, the activity information 104, the items 106, the work context 108, the analysis component 110, the reference item 112, the inference component 114, the candidate items 116, and the results 118 of FIG. 1, the system 200 including further additional components such as the background component 202 and the common terms 204 of FIG. 2, the user interactions 300 including the switching operation 302, the copy paste operation 304, the insertion operation 306, the toggle frequency measurement 308, the timestamp operation 310, the bookmarking operation 312, the link operation 314, the save operation 316, and the dwell time 318 of FIG. 3, the system 400 including further additional components such as the query component 402, the collection component 404, and the storage component 406 of FIG. 4.

The aforementioned application programs 1122, program modules 1124, and program data 1126 can further include the system 500, which comprises additional components such as the information artifacts 502, the reference artifact 504, the lexical similarities 506, and the presentation component 508 of FIG. 5, the user recognizable and usable data entity 600, the file 602, the data stream 604, the web page 606, the spreadsheet 608, the email message 610, the instant messaging conversation 612, the calendar appointment 614, the sticky note 616, and the embedded metadata 618 of FIG. 6, the system 700 including further additional components such as the score assignment 702, the weighting component 704, and the actionable menu element 706 of FIG. 7, and the implementation 800 including the reference item 802, the candidate item1 804, the candidate item2 806, the candidate item3 808, and the candidate item4 810 of FIG. 8, and the methods of FIGS. 9-10, for example.

The storage subsystem(s) 1114 and memory subsystems (1106 and 1118) serve as computer readable media for volatile and non-volatile storage of data, data structures, computer-executable instructions, and so forth. Computer readable media can be any available media that can be accessed by the computer 1102 and includes volatile and non-volatile media, removable and non-removable media. For the computer 1102, the media accommodate the storage of data in any suitable digital format. It should be appreciated by those skilled in the art that other types of computer readable media can be employed such as zip drives, magnetic tape, flash memory cards, cartridges, and the like, for storing computer executable instructions for performing the novel methods of the disclosed architecture.

A user can interact with the computer 1102, programs, and data using external user input devices 1128 such as a keyboard and a mouse. Other external user input devices 1128 can include a microphone, an IR (infrared) remote control, a joystick, a game pad, camera recognition systems, a stylus pen, touch screen, gesture systems (e.g., eye movement, head movement, etc.), and/or the like. The user can interact with the computer 1102, programs, and data using onboard user input devices 1130 such a touchpad, microphone, keyboard, etc., where the computer 1102 is a portable computer, for example. These and other input devices are connected to the processing unit(s) 1104 through input/output (I/O) device interface(s) 1132 via the system bus 1108, but can be connected by other interfaces such as a parallel port, IEEE 1394 serial port, a game port, a USB port, an IR interface, etc. The I/O device interface(s) 1132 also facilitate the use of output peripherals 1134 such as printers, audio devices, camera devices, and so on, such as a sound card and/or onboard audio processing capability.

One or more graphics interface(s) 1136 (also commonly referred to as a graphics processing unit (GPU)) provide graphics and video signals between the computer 1102 and external display(s) 1138 (e.g., LCD, plasma) and/or onboard displays 1140 (e.g., for portable computer). The graphics interface(s) 1136 can also be manufactured as part of the computer system board.

The computer 1102 can operate in a networked environment (e.g., IP-based) using logical connections via a wired/wireless communications subsystem 1142 to one or more networks and/or other computers. The other computers can include workstations, servers, routers, personal computers, microprocessor-based entertainment appliances, peer devices or other common network nodes, and typically include many or all of the elements described relative to the computer 1102. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 1102 connects to the network via a wired/wireless communication subsystem 1142 (e.g., a network interface adapter, onboard transceiver subsystem, etc.) to communicate with wired/wireless networks, wired/wireless printers, wired/wireless input devices 1144, and so on. The computer 1102 can include a modem or other means for establishing communications over the network. In a networked environment, programs and data relative to the computer 1102 can be stored in the remote memory/storage device, as is associated with a distributed system. It will be appreciated that the network connections shown are exemplary and other means of establishing a communications link between the computers can be used.

The computer 1102 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

The illustrated aspects can also be practiced in distributed computing environments where certain tasks are performed by remote processing devices that are linked through a communications network. In a distributed computing environment, program modules can be located in local and/or remote storage and/or memory system.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented contextual system, comprising:
- an activity component that monitors and records activity information related to user interaction with items associated with performing tasks in a work context;
- an analysis component that performs lexical analysis on a reference item and the items associated with the activity information to identify lexical similarities and thereby infer relationships between items worked on by the user;
- an inference component that infers candidate items based on the activity information and the lexical similarities resulting from the lexical analysis when reconstituting the work contexts;
- a presentation component for presenting the candidate items related to the work context; and
- a processor that executes computer-executable instructions associated with at least one of the activity component, the analysis component, the inference component, or the presentation component.

2. The system of claim 1, wherein the activity component further comprises a background component that monitors user activity as a background function without user interaction.

3. The system of claim 1, wherein the results of the lexical analysis comprise common terms found in the reference item and the candidate items.

4. The system of claim 1, wherein the user interaction further comprises at least one of a switching operation between the programs or data, a copy paste operation between the programs or data, an insertion operation of the programs or data into an attachment, a toggle frequency measurement, a timestamp operation, a bookmarking operation, a link operation, a save operation of an item as a copy in another location, or a dwell time.

5. The system of claim 1, further comprising a query component for explicitly querying for candidate items related to the reference item.

6. The system of claim 1, further comprising a collection component for collecting a set of candidate items and implicitly querying the set for candidate items related to the reference item.

7. The system of claim 1, further comprising a storage component for storing the activity information at least one of locally or remotely.

* * * * *